H. FOUSE.
CONTROLLING DEVICE.
APPLICATION FILED APR. 27, 1918.
1,285,663.
Patented Nov. 26, 1918.
2 SHEETS—SHEET 1.
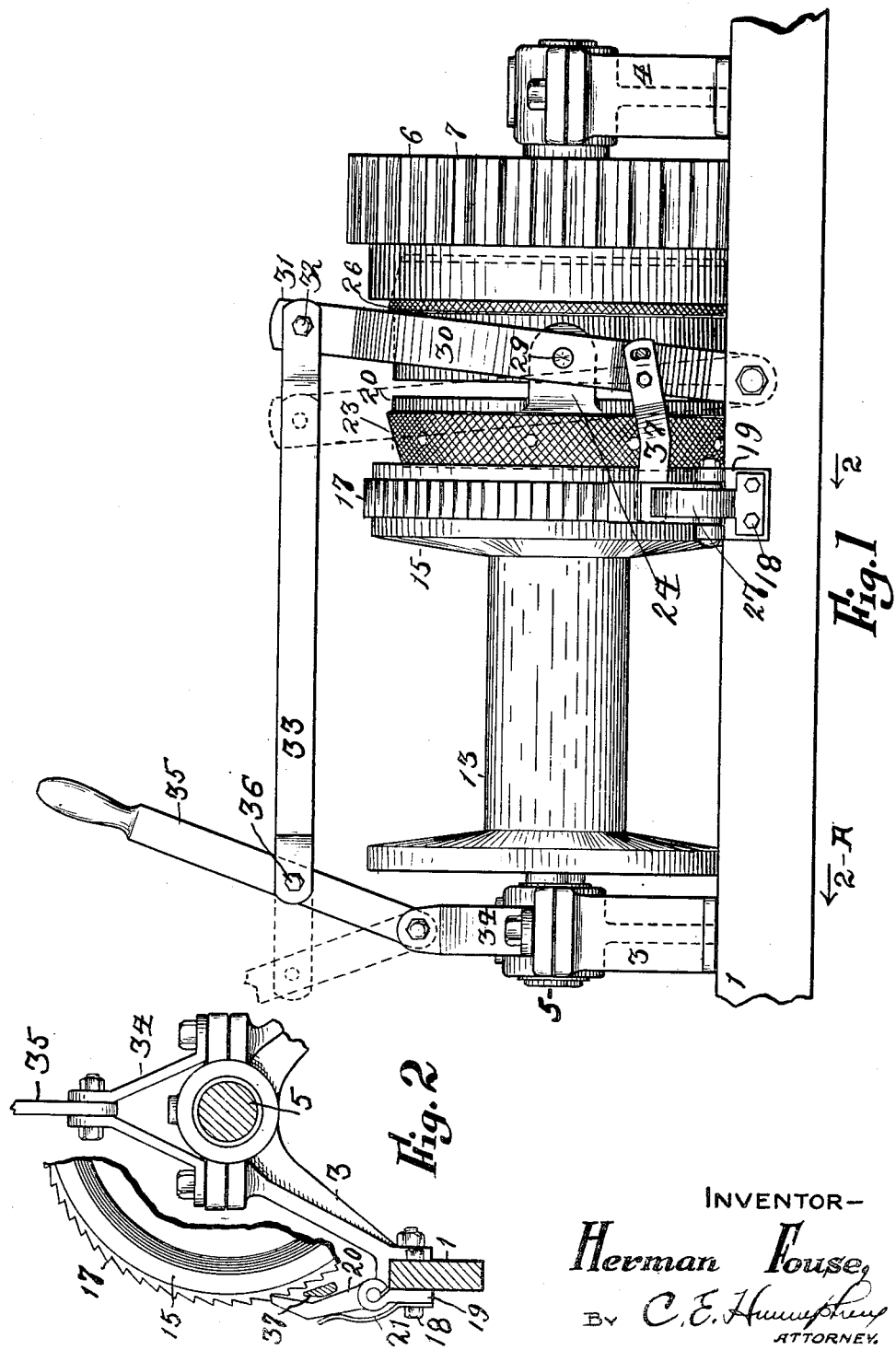
INVENTOR—
Herman Fouse,
BY C. E. Humphrey
ATTORNEY.

H. FOUSE.
CONTROLLING DEVICE.
APPLICATION FILED APR. 27, 1918.
1,285,663.
Patented Nov. 26, 1918.
2 SHEETS—SHEET 2.
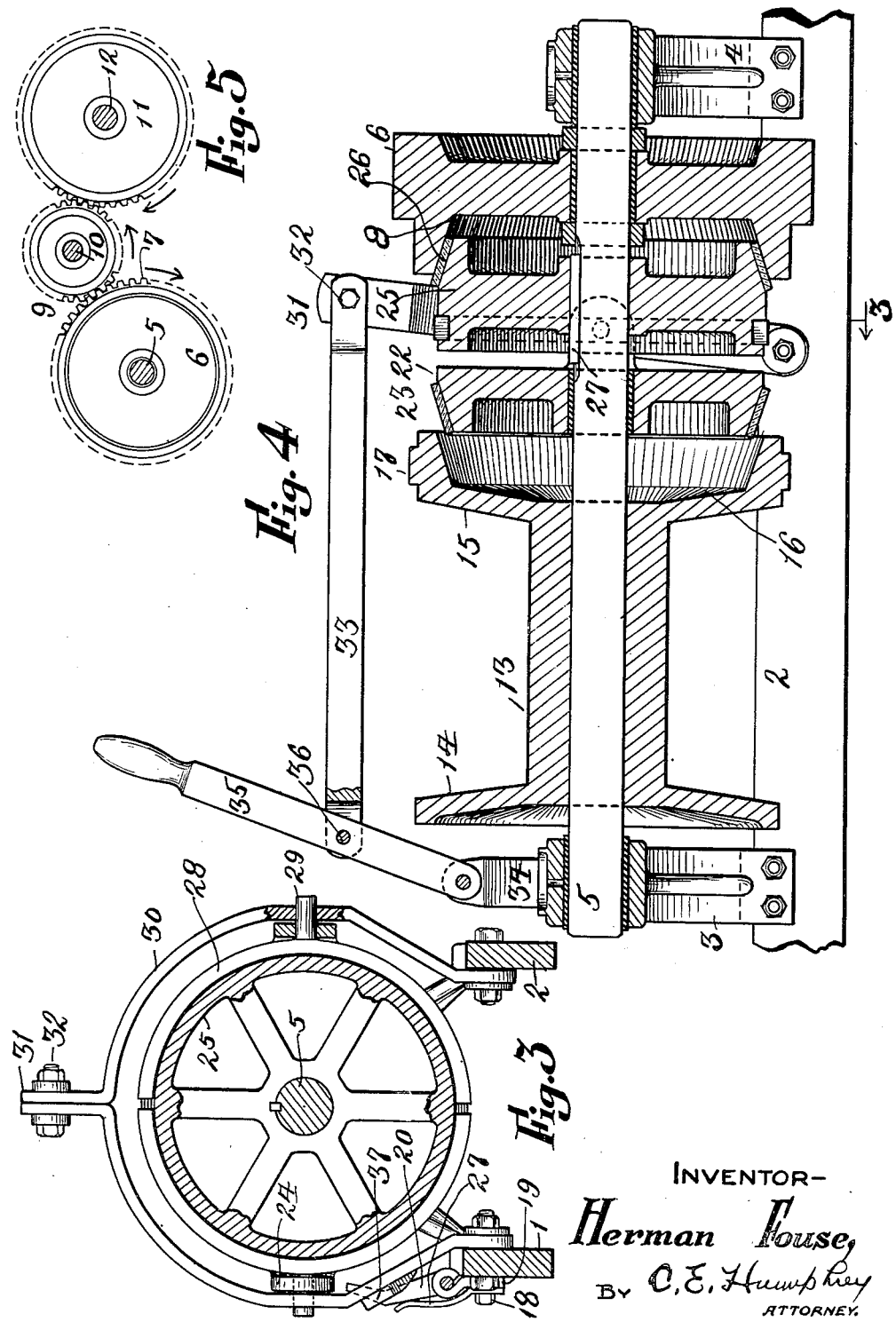
INVENTOR—
Herman Fouse,
By C. E. Humphrey
ATTORNEY.

UNITED STATES PATENT OFFICE.

HERMAN FOUSE, OF AKRON, OHIO.

CONTROLLING DEVICE.

1,285,663.   Specification of Letters Patent.   Patented Nov. 26, 1918.

Application filed April 27, 1918.   Serial No. 231,147.

*To all whom it may concern:*

Be it known that I, HERMAN FOUSE, a citizen of the United States, residing at Akron, in the county of Summit and State of Ohio, have invented new and useful Improvements in Controlling Devices, of which the following is a specification.

This invention relates to improvements in controlling devices for operating reels or drums used for elevators or hoists and the object of the invention is to provide a simple and convenient device which can be operated by a single lever the shifting of which into one position will establish clutching relation with a driving power to rotate the reel or drum and a shifting of the lever in a reverse direction will establish braking relation with the reel to control the unwinding of a flexible member from the reel.

Furthermore, it is an object of the invention to provide a safety device which is to positively operate for preventing unintentional reverse rotation of the reel and which is moved to its inoperative position when the lever is shifted to its braking position to permit reverse rotation of the reel.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different drawings, Figure 1 is a side elevation of a device embodying the present invention.

Fig. 2 is a section partially on line 2 and partially on line 2—A of Fig. 1.

Fig. 3 is a sectional view taken on line 3 of Fig. 4.

Fig. 4 is a longitudinal sectional view of the device shown in Fig. 1, and

Fig. 5 is a diagrammatic view looking from the right in Fig. 1 to show the driving gears for the mechanism shown in said figure.

Referring to the drawings in detail the reference numerals 1 and 2 denote respectively side bars of a supporting frame.

Mounted on the bars 1 and 2 are a pair of brackets 3 and 4 in which are journals for a longitudinally-extending shaft 5. Loosely mounted on the shaft 5 is a gear wheel 6 the outer face of which is provided with spur teeth 7 and the lateral face of which is fashioned with a frusto-conically-formed recess 8 to constitute the female member of a friction clutch. Arranged to intermesh with the teeth 7 is a pinion gear 9 mounted on a shaft 10 which is driven by a large spur gear 11 on a driving shaft 12. Fixedly mounted on the shaft 5 is a reel or spool 13 provided with the usual flanges 14 and 15, the flange 15 has in its side face a frusto-conically-formed opening 16 to constitute the female member of a friction brake. On the outer face of the flange 15 are ratchet teeth 17. Secured by bolts 18 or otherwise to the frame member 1 is a bracket 19 in which is pivotally mounted a pawl 20 the outer working end of which is adapted to engage the teeth 17 on the flange 15 and is held normally in this position by means of a spring 21 mounted on the bracket 19. The pawl 20 permits the rotation of the reel or drum 13 in one direction and prevents a reverse rotation thereof.

Positioned between the gear wheel 6 and the flange 15 and mounted on the shaft 5 is a combined clutching and braking device. This device consists of a disk 22 having a conically-formed outer face provided with a lining 23 arranged to coöperate with the inner face of the opening 16 in the flange 15 of the reel or drum 13. This disk 22 is loosely mounted on the shaft 5 and is furthermore provided at diametrically opposing points with ears 24 provided with apertures for a purpose to be described. The combined braking and clutching mechanism also embodies a disk 25 the outer face of which is frusto-conically-formed and provided with a suitable lining 26 to coöperate with the opening 8 in the gear wheel 6 and establish clutching relation therewith. The disk 25 is slidably mounted on the shaft 5 and is held against independent revolution thereon by means of a key or spline 27. The outer face of the member 25 is grooved to receive a split ring 28 the two members of which are provided with oppositely disposed and radially-projecting nogs 29 which are arranged to extend through the apertures in the ears 24 on the member 22.

Pivotally mounted on the two frame members of the bars 1 and 2 is a yoke 30 having apertures to receive the nogs 29 and provided at their upper portions with radially-projecting arms 31 to which is connected by means of a bolt 32 a link 33. Mounted on the bearing 3 is a bracket 34 to which is pivotally connected a lever 35 which is also connected by a pivot 36 with the link 35. Secured to one of the side portions of the yoke 30 below one of the nogs 29 is a tappet 37 so positioned as to extend between the pawl 20 and the ratchet teeth 17 and when moved to a downward direction to force the pawl 20 out of engagement with the ratchet teeth 17.

The operation of the device is as follows: Power is communicated from the driving shaft 12 through the gears 10 and 11 to the gear 6 which is freely revoluble on the shaft 5. When it is desired to operate the spool or reel 13 for raising an elevator or hoist, the lever 35 is shifted to the right in Figs. 1 and 4 causing the member 25 to establish the clutching engagement with the member 6 which rotates the shaft 5 and the reel or drum 13 simultaneously therewith. When it is desired to permit reverse rotation of the reel 13 as in cases where it is necessary to lower the elevator or hoist the same may be effectually accomplished by shifting the lever 35 to the left which terminates clutching engagement between the members 6 and 25 and establishes braking relation between the members 22 and 15 so that the unwinding of a flexible member such as a cable from the reel 13 may be controlled during the descent of the hoist.

When the lever 35 is shifted to the left in Figs. 1 and 4 and braking relations are established between the members 23 and 13 the arm 37 engages the pawl 20 and shifts it out of operative connection with the teeth 17 to permit free reverse rotation of the drum or reel to enable the lowering of an elevator or hoist connected with the flexible member which is wound on the reel or drum.

I claim,

1. A device of the character described comprising a frame, bearings on said frame, a rotatable shaft in said bearings, a reel fixedly mounted on said shaft, one of the ends of which is provided with an interiorly-disposed braking surface, a driving gear loosely mounted on said shaft and provided with an interiorly-disposed conical recess forming one member of a friction clutch, a combined driving and braking member mounted on said shaft between said gear and said spool and shiftable longitudinally of said shaft, said member comprising two parts one of which is provided with a clutch surface to coact with said gear and the other part to coact with the braking surface on said spool, a loose collar on the clutch portion of said member provided with oppositely-disposed nogs, a yoke pivoted on said frame and connecting with said nogs for shifting the position of said clutch member, ears on said braking member having connection with said nogs whereby when said yoke is shifted in one direction clutching relation is established between said gear and a portion of said combined member for inducing rotation of said shaft and when shifted in the opposite direction to terminate clutching relation and establish braking relation with said spool.

2. A device of the character described comprising a frame, bearings on said frame, a rotatable shaft in said bearings, a reel fixedly mounted on said shaft, one of the ends of which is provided with an interiorly-disposed braking surface, the outer face of the recessed end of said spool provided with ratchet teeth, a pawl mounted on said face arranged to engage said teeth, a driving gear loosely mounted on said shaft and provided with an interiorly-disposed conical recess forming one member of a friction clutch, a combined driving and braking member mounted on said shaft between said gear and said spool, and shiftable longitudinally of said shaft, said member comprising two parts one of which is provided with a clutching surface to coact with the clutching surface on said gear and the other part to coact with the braking surface on said spool, a loose collar on the clutch portion of said member provided with oppositely-disposed nogs, a yoke pivoted on said frame and connecting with said nogs for shifting the position of said clutch member, ears on said braking member having connection with said nogs whereby when said yoke is shifted in one direction clutching relation is established between said gear and a portion of said combined member for inducing rotation of said shaft, a releasing arm on said yoke arranged when said yoke is shifted in one direction to release said pawl from said ratchet teeth, and when shifted in the opposite direction to terminate clutching relation and to establish braking relation with said spool.

In testimony whereof I have hereunto set my hand.

HERMAN FOUSE.